Figure 7:
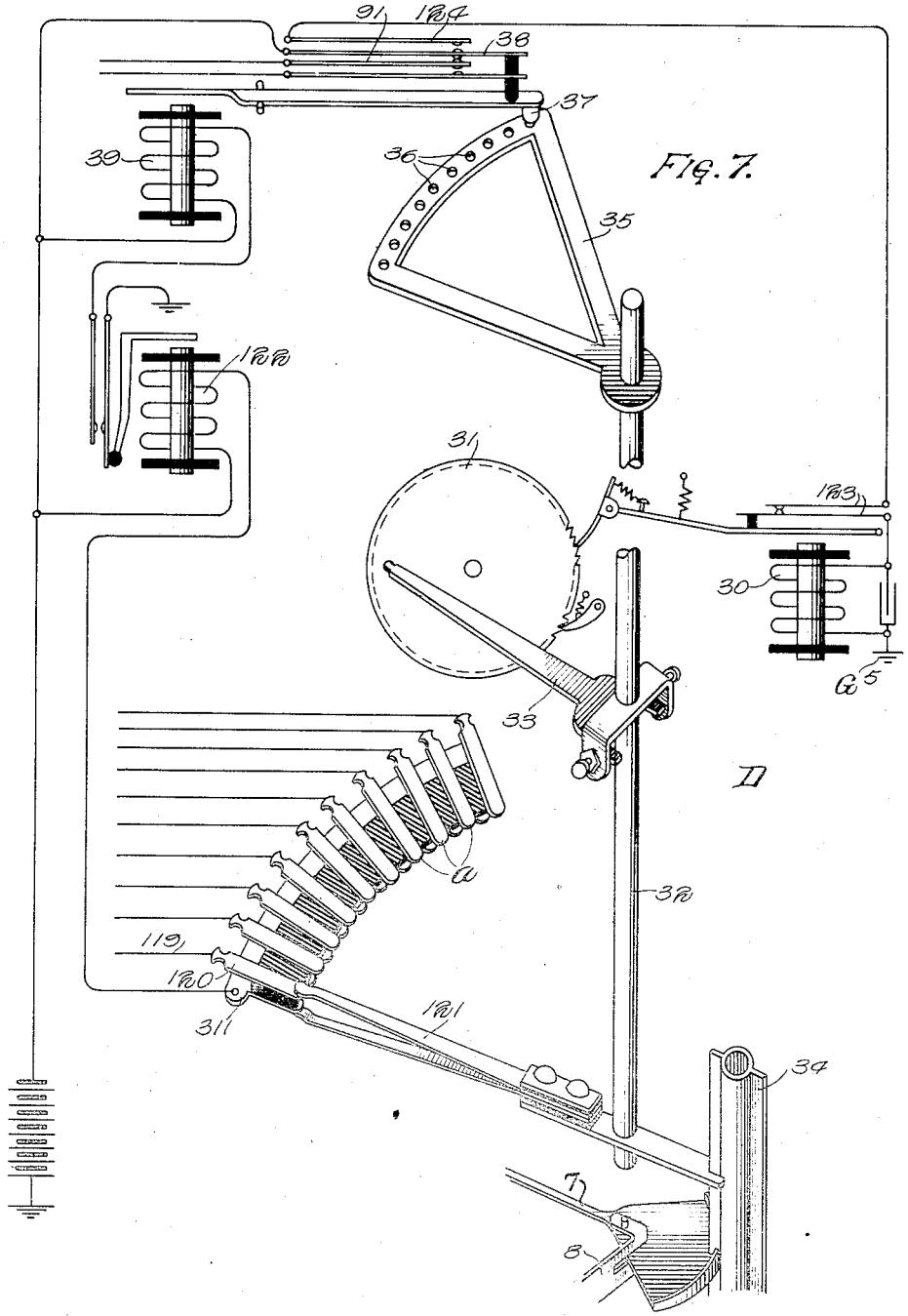

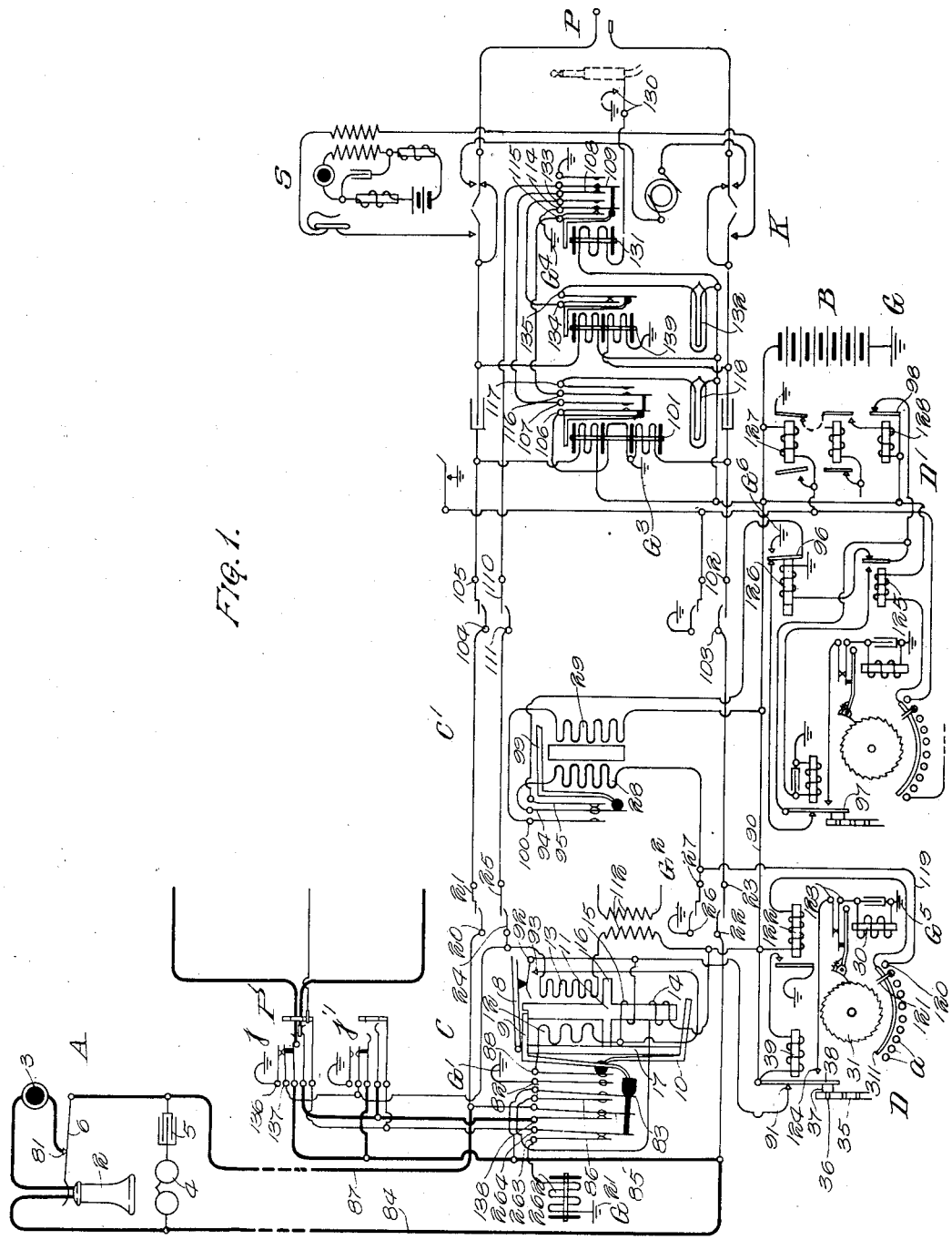

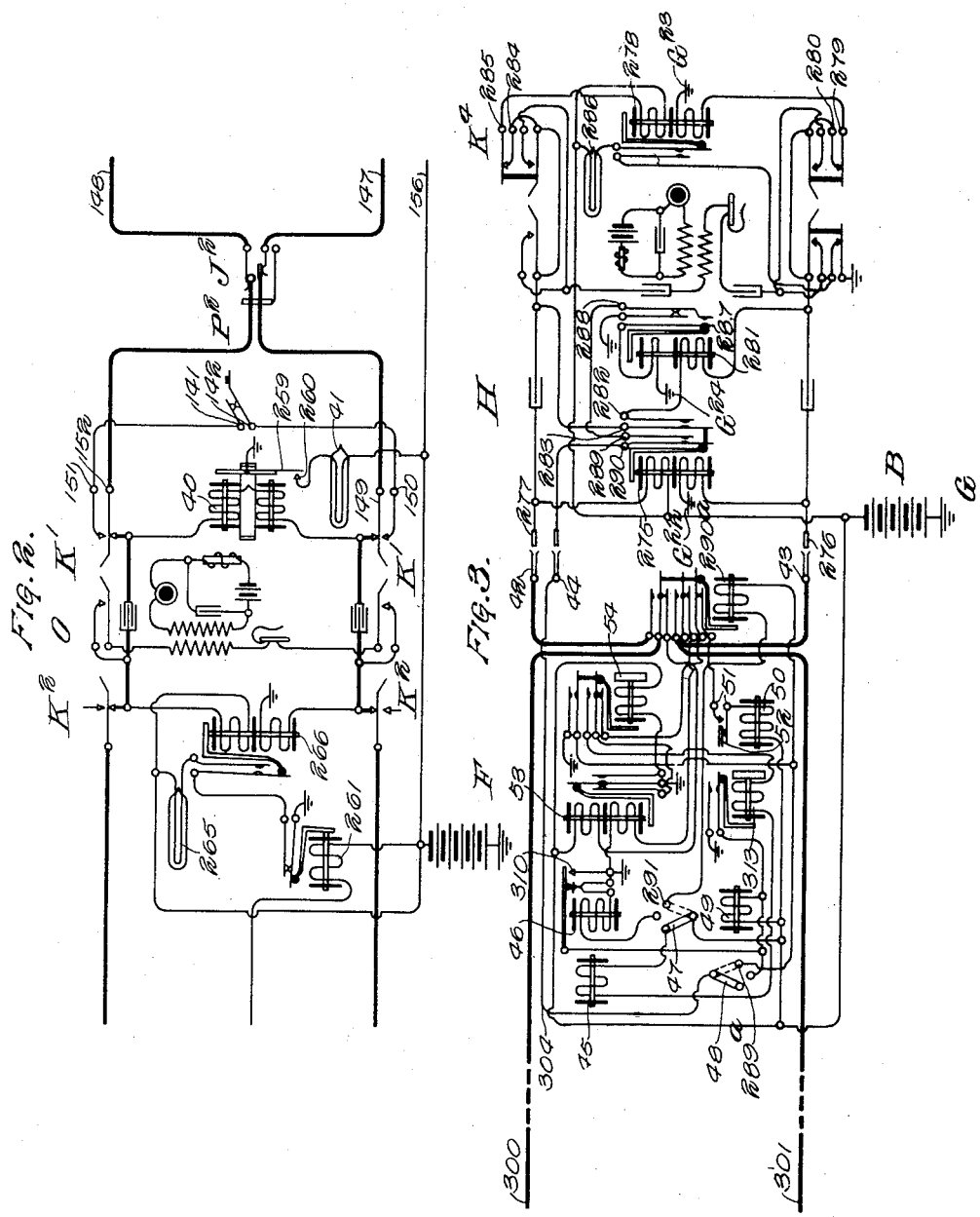

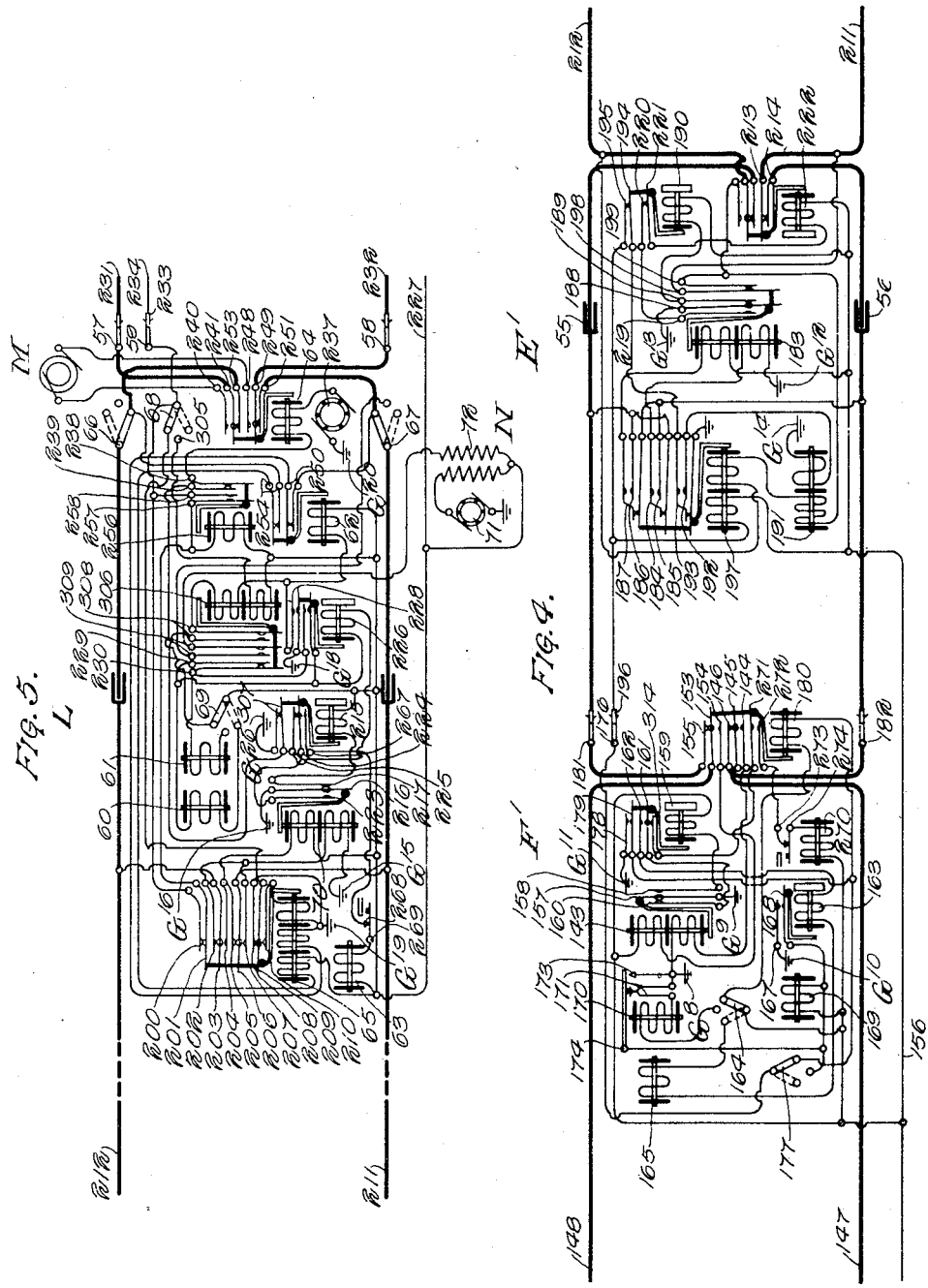

T. G. MARTIN.
SEMI-AUTOMATIC TELEPHONE SYSTEM.
APPLICATION FILED MAR. 3, 1911. RENEWED MAY 28, 1917.

1,265,225.

Patented May 7, 1918.
7 SHEETS—SHEET 4.

Fig. 6.

WITNESSES
A. Andersen.
A. J. Ray

INVENTOR:
Talbot G. Martin
By Bulkley & Durand
ATTORNEYS.

T. G. MARTIN.
SEMI-AUTOMATIC TELEPHONE SYSTEM.
APPLICATION FILED MAR. 3, 1911. RENEWED MAY 28, 1917.

1,265,225.

Patented May 7, 1918.

7 SHEETS—SHEET 6.

*Fig. 8.*

WITNESSES
A. Andersen
A. J. Ray

INVENTOR:
Talbot G. Martin
By Buckley & Durand
ATTORNEYS.

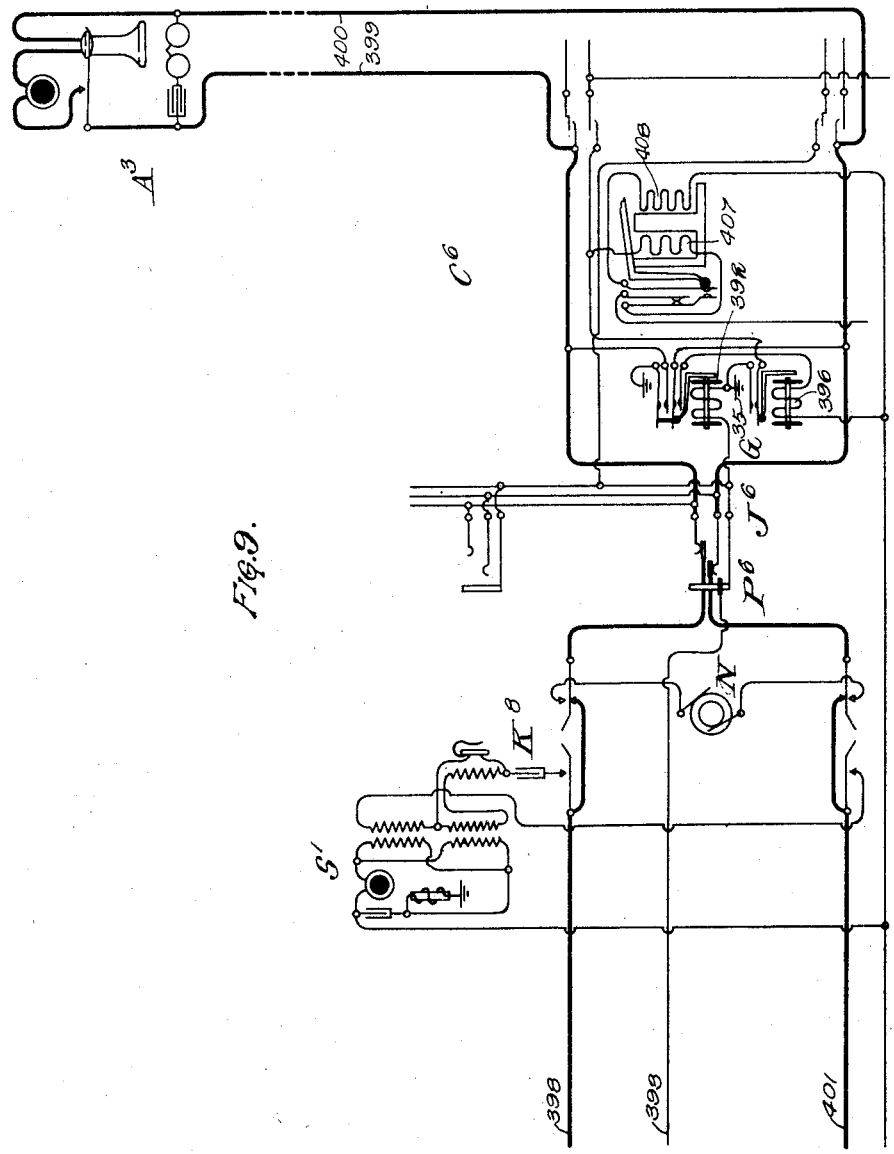

UNITED STATES PATENT OFFICE.

TALBOT G. MARTIN, OF CHICAGO, ILLINOIS, ASSIGNOR TO AUTOMATIC ELECTRIC COMPANY, OF CHICAGO, ILLINOIS, A CORPORATION OF ILLINOIS.

SEMI-AUTOMATIC TELEPHONE SYSTEM.

1,265,225.      Specification of Letters Patent.      Patented May 7, 1918.

Application filed March 3, 1911, Serial No. 612,084. Renewed May 28, 1917. Serial No. 171,584.

*To all whom it may concern:*

Be it known that I, TALBOT G. MARTIN, a citizen of the United States of America, and resident of Chicago, Cook county, Illinois, have invented a certain new and useful Improvement in Semi-Automatic Telephone Systems, of which the following is a specification.

My invention relates to telephone systems of that kind in which an operator must answer calls from lines of different character—that is to say, from lines some of which are equipped for measured service, and some of which are equipped for unmeasured service, or which differ in any other manner, requiring that the operator must find out from where the call comes before it can be properly extended, which is particularly essential in a semi-automatic system.

My invention contemplates, therefore, a system in which means are provided for automatically indicating to the operator the character of the line calling.

It contemplates, moreover, a system of this kind in which the signal that indicates the character of the calling line is given the operator at the time the call is answered.

Thus the operator knows immediately whether the call is, for example, from a measured service line or from an unmeasured service line, or from some other kind of line, there being as many different indicating expedients as there are different kinds of lines.

The nature and advantages of my invention will, however, hereinafter more fully appear.

In the accompanying drawings Figures 1, 2, 4, 5 and 6 taken together represent a complete connection between a manual substation A (Fig. 1) and an automatic substation A' (Fig. 6) in a system embodying the principles of my invention. Fig. 1 also shows apparatus by means of which the subscriber at substation A may obtain connection with a subscriber at another substation of the same kind. Figs. 6 and 3 show apparatus by means of which the subscriber at the automatic substation A' may communicate with an operator for the purpose of requesting a connection with a line in some other exchange. Fig. 7 is a diagrammatic illustration of the master switch D of Fig. 1. Figs. 8 and 9 show a connection established between two substations A² and A³ through the medium of apparatus similar to that shown in Fig. 1.

In Fig. 1 the line of the substation A is equipped at the central office with the usual multiple jacks $j$ and $j'$; but, instead of being provided with the usual answering jack, is provided with an automatic trunking switch C. This automatic switch C, together with a number of other similar switches, has access to a number of trunk lines each of which leads to a so-called secondary trunking switch C'. These secondary trunking switches are usually arranged in groups, and the trunk lines leading from each group of primary trunking switches are distributed among the different groups of secondary switches. Each group of secondary switches has access to trunk lines which lead to operators' trunk lines terminating in plugs P. With this arrangement a number of plugs may be made common to all of the substations A in the exchange. Any subscriber at a substation A, wishing to make a call, simply removes his receiver, whereupon the switches C and C' automatically operate to extend his line to one of the plugs P and to signal the operator. The operator completes the connection by inserting the plug P into a multiple jack of the line called for—that is, provided said line is a manual line similar to the line A. If the line called for should be a line of an automatic exchange, such as the substation A' (Fig. 6) the plug P² of a cord O (Fig. 2) would be inserted into a jack J² of a trunk line leading to the automatic exchange, and the automatic subscriber would be called in the usual manner. The plug P' (Fig. 1) of the cord O is then inserted into a jack of the calling line.

The automatic substation A' (Fig. 6) has allotted to it at the central office the primary trunking switch C². If the subscriber at substation A' wishes to call one of the manual substations A he operates the primary and secondary switches C² and C³, the repeater E and selector F (Fig. 3) to extend his connection to an operator's trunk circuit H. No connection is made through this trunk, however, but the operator is simply given the order over it. The calling subscriber then hangs up his receiver and breaks connection with the trunk H. The operator then calls back to the calling line by inserting the plug P² of the cord O into a trunk line leading to the automatic exchange and operating the switches to connect with the calling line, and then the operator inserts the plug P' of said cord into a jack of the called line.

The manual substation A may be of any suitable type, and, as shown herein, it comprises the usual receiver 2, transmitter 3, ringer 4, condenser 5 and switch hook 6.

The trunking switch C, as shown, is of the general type disclosed in British Patent No. 26,301 of 1906, and in the *American Telephone Journal* of New York, N. Y., of June 6, 1908, being of a somewhat modified construction. The switch C comprises the usual plunger 7 (Fig. 7) attached to the end of the plunger arm 8. The plunger arm 8, together with the relay armatures 9 and 10, is controlled by the magnet 11. The magnet 11 comprises four windings, namely, a so-called pull-in winding 12, a holding and cut-off winding 13, line winding 14 and an auxiliary winding 15. The core of the magnet is provided near the center of its length with a lateral projection 16 by means of which the magnet is attached to the bracket 17 upon which the armatures 8, 9 and 10 are pivoted. With this method of mounting the magnet, the magnetic circuit of the windings 12 and 13 is maintained separate from that of the windings 14 and 15, so that the armatures upon one end of the magnet are not affected by the windings upon the other end. Of the two windings upon the upper end of the magnet only the winding 12 is strong enough to attract the plunger arm 8 from its normal position. The winding 13 is strong enough, however, to hold the plunger arm in its operated position after it has once been pulled down. When the plunger arm is pulled down it forces the plunger into a bank of contact springs in the usual manner, forcing springs 20, 21, 22, 23, 24, 25, 26 and 27 into contact in pairs. The secondary switch C' is similar to the switch C except that it has only two windings, namely, a pull-in winding 28 and a holding winding 29.

The master switch D which controls the plungers of a group of line switches C is of the general type disclosed in said British Patent #26,301 and *American Telephone Journal*, being of a somewhat modified construction, as shown in Fig. 7. The master switch consists essentially of a motor magnet 30 for driving the ratchet wheel 31. The ratchet wheel 31 is connected with the shaft 32 by means of a link 33 in such a manner that a rotary motion of the ratchet wheel is transmitted to the plunger shaft 34, giving to it an oscillatory motion about the shaft 32 so as to move the idle plungers back and forth in front of their trunk terminals. To the shaft 32 there is secured a locking plate 35 provided near its outer edge with a number of openings 36 which are adapted to be engaged by a pin 37 upon the end of the armature 38 of relay 39. These openings are so spaced that the pin 37 can engage one of them only when the plungers that are engaged with the plunger shaft are directly in front of the corresponding trunk terminal. The master switch is also provided with a bank of contacts comprising a common segment 311 and one individual segment a for each trunk line to which the switch C has access.

The operator's cord O (Fig. 2) is similar to the usual operator's cord used in manual switch-board practice, the supervisory circuits being especially adapted to the system shown herein. The supervisory relay 40 is a polarized relay and consequently will close the circuit of lamp 41 only when current flows through the relay 40 in a certain direction.

The selector F (Fig. 3) is of the general type disclosed in United States Letters Patent #815,321, granted March 13, 1906, to Keith, Erickson and Erickson, being somewhat modified, however, in order to operate in a two-wire system. Among other details it comprises the usual wipers 42, 43 and 44 carried upon a shaft (not shown) which has a vertical motion controlled by the vertical magnet 45 and a rotary motion controlled by the rotary magnet 46. The usual side switch, comprising the wipers 47 and 48, is controlled by the private magnet 49 in the usual manner. Means for restoring the switch to normal position is provided in the release magnet 50. As long as the switch shaft is in its lowest position the circuit of the release magnet is opened at the springs 51, which are separated by the arm 52 which is attached to the switch shaft. The mechanism of the switch is released immediately upon the energization of the release magnet, rather than by its deënergization as shown in said selector patent. The switch is controlled through the medium of the double-wound line relay 53. The relays 54 and 313 are slow-acting, i. e., slow to deënergize when their circuits are broken. The private magnet 49 is controlled by the rotary magnet 46 electrically through the medium of the contact point 310 instead of mechanically, as is shown in the selector patent referred to.

The operator's trunk H is in the nature of a so-called recording toll trunk, i. e., it is for use in giving orders to the operator and not for actually making connections.

The selector F' (Fig. 4) is similar to the selector F (Fig. 3).

The apparatus shown at E' (Fig. 4) is a repeater for repeating impulses from one exchange to another and around the condensers 55 and 56.

At L (Fig. 5) there is shown an automatic connector switch which is of the general type of connector switches disclosed in United States Letters Patent #815,176, granted March 13, 1906 to Keith, Erickson and Erickson, being modified, however, like the selectors, to operate in a two-wire system. It comprises the usual shaft (not shown) and wipers 57, 58 and 59, vertical magnet 60, rotary magnet 61, private magnet 62, release magnet 63, ringer relay 64, back-bridge relay 65 and side switch comprising the wipers 66, 67, 68 and 69. The usual line relays are here combined in the double-wound relay 70.

At M (Fig. 5) there is shown a ringing current generator, and at N is represented a busy line signaling machine comprising a current interrupter 71 and a transformer or induction coil 72.

The automatic substation A' (Fig. 6) comprises the usual receiver 73, transmitter 74, ringer 75, condenser 76 and switch hook 312. Since it is an automatic substation it is also provided with an impulse wheel 77 attached to a shaft 78 to which there is also secured a dial (not shown) provided with finger holes. The impulse wheel is provided upon its periphery with a number of impulse teeth which are so arranged that as the impulse wheel returns to normal position, after having been rotated through the medium of the dial, each tooth that passes the end of impulse spring 79 forces said spring out of engagement with the spring 80.

Having given a general description of the apparatus I will now explain in detail the manner in which connections are established between the various lines, showing how the operator is enabled to identify the character of the lines. When the subscriber at substation A wishes to make a call he does so by removing his receiver from the switch hook in the usual manner. The hook thereupon engages contact point 81, thereby completing a circuit from ground G' through springs 82 and 83, line 84, receiver 2, transmitter 3, springs 81 and 6, line 87, springs 85 and 86 and line winding 14 of switch C to battery lead 90, thence through the battery B to ground G. The winding 14 thereupon attracts the armature 10, which operates to close a circuit from ground G' through springs 82 and 88, windings 12 and 15, contact point 91 and armature 38 to the battery lead 90. The winding 12 thereupon attracts the plunger arm 8 and cut-off armature 9. The plunger arm operates to cause the plunger to press the bank springs 20—27 together, as previously explained, while the armature 9 operates to disconnect the ground G' and line winding 14 from the line. The armature 10 does not fall back and break the circuit of winding 12 immediately upon the deënergization of line winding 14, because the plunger arm short-circuits the auxiliary winding 15 at the springs 92 and 93, thereby causing said winding to deënergize slowly and hold up the armature 10 for an instant. This provides time for the circuit of winding 13 to be closed before the winding 12 is deënergized. The winding 13 is energized as follows: When the bank springs 26 and 27 are forced into contact by the plunger of switch C a circuit is closed from ground G² through said springs, winding 28 of switch C', springs 94 and 95 and armatures 96, 97 and 98 to the battery lead 90. The winding 28 attracts the plunger arm 99, which operates to close the bank springs in the switch C', and also to shift spring 94 out of engagement with spring 95 and into contact with spring 100, whereby the winding 28 is connected to battery through the winding 29, thus establishing a holding circuit for the switch C' independent of the contacts of the relays of the master switch D'. The combined operations of the switches C and C' extend the line connection to a trunk line leading to a plug P, whereupon the relay 101 becomes energized over a circuit extending from ground G³ through the lower winding of said relay, bank springs 102, 103, 23 and 22, line 84, substation A, line 87, springs 20, 21, 104 and 105 and upper winding of relay 101 to the battery. The relay 101, upon energizing, operates to complete a circuit from ground G³ through the middle winding of relay 101, springs 106 and 107, 108 and 109, bank springs 110 and 111, 25 and 24, winding 13 and secondary winding of the induction coil 112 to battery. As before explained, this circuit through the winding 13 is closed before the circuit of winding 12 is broken, and therefore the plunger arm remains in its operated position. The relay 101, upon energizing, also completes a circuit from ground G⁴ through springs 114 and 115, 116 and 117 and lamp 118 to battery, whereby the operator is signaled. The operator answers by throwing the key K to bridge the talking set S across the line.

The manner in which the operator is enabled to identify the character of the calling line is as follows: It will be remembered that the circuit of the holding winding 13 of switch C includes the secondary winding of the induction coil 112 and also a winding of relay 101. This winding on the relay 101 has a low number of ampere turns and alone will not operatively energize the relay, but it affords an inductive connection between the circuit of secondary winding of induction coil 112 and the line circuit. The primary winding of the induction coil 112 is connected to an alternating current generator, and therefore when the operator connects her talking set with the line she will hear a tone which will indicate that the calling line is of a certain character. If there are only two different kinds of lines to be distinguished between, the cut-off windings of one kind may be connected to battery through an induction coil, as shown, while this induction coil may be omitted from the other lines. If there are more than two kinds of lines, tone tests of different characters may be used, one for each class of lines. These different tone tests may be produced by interrupting the tone test current for the different kinds of lines at different intervals, or in any other of the well known ways.

Returning now to the operation of the line switch C, it will be seen that when the bank springs 26 and 27 are forced into contact, a circuit is completed from ground $G^2$ through said springs, conductor 119, contact 120, wiper 121, segment 311 and relay 122 to battery. The relay 122, upon energizing, completes the circuit of relay 39, which operates to withdraw the pin 37 from the plate 35 and close the circuit of the motor magnet 30. This circuit extends from ground $G^5$ through motor magnet 30, springs 123, contact point 124 and armature 38 to battery. The motor magnet then begins to operate in a manner similar to that of a buzzer to move the plungers of the idle switches away from the trunk seized. Shortly after the master switch begins to operate, the wiper 121 passes off the contact 120 and the relays 122 and 39 deënergize. The master switch continues to operate, however, until the next opening passes under pin 37. If the trunk corresponding to this opening is idle, the pin 37 drops into it and permits the armature 38 to disengage the contact point 124 to break the circuit of the motor magnet. If this trunk is busy, however, the wiper 121 finds the corresponding contact grounded and the relays 122 and 39 remain energized until the next opening has passed the pin 37, and the plungers are carried past the busy trunk (or trunks) to an idle one.

When the line switch C' operates, the master switch D' operates in the same manner as the master switch D to advance the plungers of the idle switches C' to an idle trunk. It will be noted that the armature of relay 125, which corresponds to relay 122 of the master switch D, controls, through a back contact, the circuit of a slow acting relay 126. If the plungers of the switches C' do not pass any busy trunks, the circuit of relay 126 is not broken long enough to permit its armature to fall back. If, however, the plungers do have to pass idle trunks, the relay 125 remains energized long enough to cause relay 126 to deënergize. When the armature of relay 126 falls back it disconnects the pull-in windings of all the switches C' which are controlled by master switch D' from battery, and extends a guarding potential from the ground $G^6$ through the windings 28 of the idle switches C' to the contacts in the banks of the master switches D corresponding to the trunks leading to the said switches C', thereby preventing the master switches D from stopping on said trunks. Thus no connection will be extended to a secondary switch while its plunger is in motion. Any call coming in at this time will be diverted to a group of secondary switches whose master switch is not operating. It should be stated that although the relay 122 of master switch D will energize in series with the winding 28 of switch C', said switch will not be operated, due to the comparatively high resistance of relay 122.

Each of the trunks leading from the switches C' is provided with a relay 127. When all these trunks in one group become busy these relays operate to close the circuit of relay 128, which operates to disconnect the battery from armature 97 to stop the operation of the master switch D', and to open the circuit of relay 126 which operates, as explained, to prevent any connection from being extended to a secondary switch which is controlled by said master switch.

After the operator has answered the call, if the line called for is another line similar to the calling line A, the plug P is simply inserted into a multiple jack of the called line. When the plug P is removed from its seat the springs 130 engage, whereby a circuit is completed through relay 131, which operates to remove the test tone current from the middle winding of relay 101, to ground winding 13 of switch C direct, to open the circuit of lamp 118 and close the circuit of lamp 132. This circuit extends from ground $G^4$ through springs 114, 133, 134 and 135 and lamp 132 to battery. When the plug P is inserted into the jack of the called line the cut-off winding of its line switch C is energized. This will be explained in connection with line A.

It will be seen that when a plug is inserted into a multiple jack of such a line the springs 136 and 137 are forced into contact, whereby the circuit of winding 13 is closed. The armature 9 is thereupon attracted and operates to disconnect the ground G' and winding 14 from the called line, and to connect the line 87 with the multiple jacks through springs 85 and 138. This is the position in which switch C is shown in Fig. 1, as it is there assumed that line A has been called through jack j.

When the plug P is inserted into the jack of a called line and the called subscriber removes his receiver, said line is provided with talking battery current through the windings of the relay 139, which energizes and extinguishes the lamp 132. When the called subscriber hangs up his receiver the relay 139 deënergizes again, lighting the lamp 132, which gives the operator a disconnect signal. When the calling subscriber hangs up his receiver the relay 101 deënergizes, and when the plug P is restored to its seat the relay 131 deënergizes. When both of these relays deënergize, the winding 13 of the switch C is deënergized and the plunger of said switch restores to normal position, breaking the circuit of the switch C', which thereupon restores also.

In case the subscriber at substation A desires connection with a subscriber of the automatic exchange, he hangs up his receiver after giving the operator his own number and the number of the line desired, whereupon the switches C and C' release in the manner just described. The plug P² of the cord O is then inserted into the jack J² and the key K' is operated to bridge the calling device (springs 141 and 142) across the line. When this occurs a circuit is closed from ground G⁸ through the lower winding of the relay 143 of the selector F' (Fig. 4), springs 144 and 145, conductor 147, sleeve conductors of the jack J² and plug P², springs 149 and 150, impulse springs 142 and 141, springs 151 and 152, tip of the plug P² and jack J², conductor 148, springs 153 and 154 and upper winding of relay 143 to battery lead 156. The relay 143, upon energizing, completes a circuit from ground G⁹ through springs 157 and 158 and relay 159 to battery lead 156. The operator now operates the calling device for the first digit of the number of the called substation A', #220. The circuit of the selector line relay 143 is momentarily broken twice at the impulse springs 141 and 142 in response to this operation of the calling device. The relay 159 of the selector, being slow acting, does not deënergize during the momentary interruption of its circuit by the relay 143; consequently, each time said relay 143 deënergizes it closes a circuit through the vertical magnet 165. This circuit extends from ground G⁹ through springs 157 and 160, 161 and 162, relay 163, vertical magnet 165 and side switch wiper 164 to battery lead 156. The vertical magnet operates in response to the two impulses received over this circuit to raise the shaft and wipers two steps. The relay 163, which is included in circuit with the vertical magnet, is energized by the first impulse, but being a slow acting relay does not allow its armature to fall back until after the last impulse has been delivered. In its energized position the relay 163 closes a circuit from ground G¹⁰ through springs 167 and 168 and private magnet 169 to battery lead 156. This circuit is broken when the relay 163 deënergizes after the last impulse has been delivered to the vertical magnet; and the private magnet thereupon deënergizes also and permits the side switch to pass to second position. In passing from first to second position the side switch wiper 164 disconnects the battery from the vertical magnet and closes a circuit through the rotary magnet 170. This circuit extends from ground G⁸ through the interrupter springs 171, magnet 170 and side switch wiper 164 to battery lead 156. The rotary magnet 170 will then continue to operate in a manner similar to that of a buzzer to rotate the wipers step by step as long as the side switch remains in second position. As soon as the rotary magnet energizes the first time, a circuit is closed from ground G⁸ through contact point 173, armature 174 and private magnet 169 to battery. The private magnet is energized over this circuit and is again deënergized when the rotary magnet deënergizes after having rotated the wipers the first step, provided the first trunk line upon which the selector wipers are rotated is idle. If this trunk is busy, however, the private wiper 176 finds the contact which it engages provided with a guarding ground potential. A new circuit is then closed through the private magnet extending from said grounded contact through the wiper 176, side switch wiper 177 and magnet 169 to battery lead 156. The private magnet then does not deënergize when the rotary magnet armature falls back, and the side switch is locked in second position. The rotary magnet then continues to advance the wipers step by step until the contacts of an idler trunk are reached, whereupon the private magnet deënergizes, permitting the side switch to pass to third position and break the circuit of the rotary magnet. When the side switch wiper 164 reaches third position a circuit is closed from ground G¹¹ through springs 178 and 179, relay 180 and wiper 164 to battery. The relay 180, upon energizing, operates to disconnect the line relay 143 from the line and to extend the connection through the wipers 181 and 182 to the repeater E'. When the circuit is thus extended to the repeater its line relay 183 is energized over a circuit extending from ground G¹² through the lower winding of said relay, springs 184 and 185, selector wiper 182, springs 146 and 145, conductor 147, thence through the operator's calling device and back through the conductor 148, springs 153 and 155, wiper 181, springs 186 and 187 and upper winding of relay 183 to battery. The relay 183, upon energizing, closes a circuit from ground G¹³ through springs 188 and 189 and relay 190 to battery lead 156. The relay 190, upon energizing, provides a new circuit for the relay 180 of the selector F' extending from ground G¹⁴ through the right-hand winding of coil 191, springs 192 and 193, 194 and 195, bank contact 196, private wiper 176, side switch wiper 177, relay 180 and side switch wiper 164 to battery lead 156. This circuit maintains the relay 180 energized after its original circuit is broken by the deënergization of the slow-acting relay 159. The trunk leading to the repeater E' is also protected from seizure over any of its multiple contacts by a guarding potential extending from ground G¹⁴ to the private bank contact 196 and thence to the corresponding contact in the bank of each selector which has access to the repeater E'. Another result of the energization of relay 190 is the closure of a circuit from ground G¹⁴ through the right-hand winding of coil 191, springs 192 and 193, 194 and 195 and left-hand winding of relay 197 to battery. The relay 197 is so constructed and adjusted that it cannot be operatively energized by one winding alone, but requires the combined energization of both its windings to cause it to attract its armature.

The engagement of springs 198 and 199, upon the energization of the repeater line relay 183, closes a circuit through the line relay 70 of the connector L (Fig. 5), said circuit extending from ground G¹⁵ through the lower winding of said relay, springs 207 and 206, conductor 211, springs 198 and 199, left-hand winding of impedance coil 191, right-hand winding of relay 197, conductor 212, springs 203 and 204 and upper winding of relay 70 to battery. Although both windings of the relay 197 of the repeater now carry current, the relay is not operated because the current flows through the two windings in opposite directions. The energization of the line relay 70 of the connector serves to close a circuit through the slow acting relay 215. This circuit extends from ground G¹⁶ through springs 216 and 217 and relay 215 to battery lead 227.

The apparatus is now in position for the reception of impulses for the second digit 2. The line relay 183 of the repeater E' is deenergized twice by the impulses for this digit, each time breaking the circuit of the connector line relay at the springs 198 and 199. The relay 190, being slow acting, does not deënergize between impulses; consequently, each time the relay 183 deënergizes it also closes a circuit from ground G¹³ through springs 188 and 219, springs 220 and 221 and relay 222 to the battery lead 156. The relay 222 is energized by the first impulse and remains in its energized position until after the last impulse has been delivered. In its energized position the relay 222 disconnects the condensers 55 and 56 from the trunk lines 211 and 212, and short circuits the right hand winding of relay 197 and left-hand winding of coil 191 to remove their resistance from the circuit of the connector line relay while it is operating. Each time the line relay 70 of the connector deënergizes in response to the breaking of its circuit by the line relay of the repeater, a circuit is closed from ground G¹⁶ through springs 216 and 223, springs 224 and 225 (the slow relay 215 remains energized between impulses), relay 226, vertical magnet 60 and side switch wiper 69 to the battery lead 227. The vertical magnet is energized twice over this circuit and operates to raise the shaft two steps. The slow acting relay 226 is energized in series with the vertical magnet and does not deënergize until after the last impulse is delivered. Upon energizing, the relay 226 closes a circuit from ground G¹⁸ through springs 228 and private magnet 62 to battery lead 227. When this circuit is broken after the last impulse has been delivered to the vertical magnet, the private magnet 62 deënergizes and the side switch passes to second position. By this action the wiper 69 transfers the battery connection from the vertical magnet to the rotary magnet 61.

When the operator's calling device is operated for the last digit 0 the repeater E' operates in the same manner as for the previous digit, except that ten impulses instead of two are repeated to the connector L. Each time the connector line relay 70 deënergizes in response to the impulses, a circuit is closed from ground G¹⁶ through springs 216 and 223, 224 and 225, relay 226, springs 229 and 230, rotary magnet 61 and side switch wiper 69 to battery. The rotary magnet is energized ten times over this circuit and operates to rotate the wipers onto the contacts of the desired line. The relay 226 operates in the same manner as for the previous digit to close the circuit of the private magnet 62 while the rotary magnet is operating. If the called line is idle the private magnet deënergizes when its circuit is broken by the relay 226 after the last impulse is delivered to the rotary magnet, and the side switch passes to third position, completing the connection with the called line (Fig. 6) through the side switch wipers 66 and 67, shaft wipers 57 and 58 and conductors 231 and 232. The movement of side switch wiper 68 to third position provides a guarding potential for the connector private bank contacts of the called line, and closes an energizing circuit for the cut-off winding of the line switch C². This circuit extends from ground G¹⁹ through the right-hand winding of the back-bridge relay 65, springs 210 and 209, side switch wiper 68 and private wiper 59 to private bank contact 233 and thence to the corresponding contact in the bank of each connector which has access to the line #220. From contact 233 the circuit extends farther over conductor 234, through the winding 235 of switch C² and through the secondary winding of the tone test induction coil 236 to battery lead 227. The winding 235, upon energizing, operates to disconnect the switch C² from the line. The circuit of the winding 235 includes the secondary winding of the induction coil 236 and the right-hand winding of the back-bridge relay 65. This winding of the relay 65 has a low resistance and a small number of turns, and therefore does not cause the relay to operate, nor interfere with the energization of the cut-off winding 235. The only function of this third winding on the relay 65 is to furnish an inductive connection between the circuit of the identifying tone test induction coil 236 and the line circuit, which connection is obtained through the medium of the other two windings of the relay 65, which are connected with the line. Thus, if the operator throws the key K' in the opposite direction and bridges the talking set across the line after the calling device has been operated for the last digit, she is enabled to identify the character of the line called.

At the instant the side switch wiper 69 of the connector L reaches third position a circuit is closed from ground $G^{20}$ through interrupter 237, ringer relay 64, springs 238 and 239 and wiper 69 to battery. Since this circuit includes the interrupter 237, the relay 64 is energized intermittently, each time operating to close a signaling circuit from one terminal of the generator M through springs 240 and 241, wiper 57, conductor 231, springs 242 and 243, line 244, ringer 75, condenser 76, springs 245 and 246, line 247, conductor 232, wiper 58 and springs 249 and 248 to the other terminal of the generator. When the called subscriber removes his receiver the called substation is provided with talking current over a circuit extending from ground $G^{19}$ through the middle winding of the connector back-bridge relay 65, private magnet springs 250, ringer relay springs 251 and 249, thence to the substation A' and through the springs 246 and 252, receiver 73 and transmitter 74 and back over the other side of the line to the connector, through ringer relay springs 241 and 253, private magnet springs 254 and left-hand winding of relay 65 to battery lead 227. The relay 65, upon energizing, operates to cut its right-hand winding off circuit at springs 208, 209 and 210 to remove the test tone from the line. The closure of springs 200 and 201 closes a circuit from ground $G^{19}$ through springs 208 and 209, side switch wiper 68, springs 200 and 201 and relay 256 to battery lead 227. The relay 256, upon energizing, opens the circuit of the ringer relay and forms a locking circuit for itself through springs 257 and 258 so that the circuit of the relay 64 cannot be closed again before the connection is released. The shifting of the springs 206 and 203 of the back-bridge relay 65 transposes the connections between the windings of the line relay 70 and the trunk conductors 211 and 212, whereby the current in the line between the repeater and connector is reversed in direction. This reversal of the current causes the two windings of relay 197 of the repeater E' to assist each other, whereby the relay is energized and in turn operates to reverse the direction of the current in the line leading from the cord O. At the cord O it will be seen that the restoration of the key K' after the call is completed bridges the relay 40 across the line in place of the calling device. The current at first flows through this relay in the proper direction to cause the closure of the circuit of lamp 41 at springs 259 and 260, but when the current is reversed by the response of the called subscriber the armature of relay 40 is attracted in the opposite direction and the lamp 41 is extinguished.

It now remains for the original calling subscriber to be called. This is done by inserting the plug P' into the multiple jack $j$ of the calling line and operating the key $K^2$ to bridge the ringer generator across the line. The insertion of the plug into the jack causes the energization of the cut-off winding 13 of the line switch C, as has been previously explained. At the same time the relay 261 is energized over a circuit extending from ground $G^{21}$ through coil 262, springs 263 and 264, sleeve contacts of jack $j$ and plug P' and relay 261 to battery. The relay 261, upon energizing, closes the circuit of lamp 265. When the receiver at station A is removed the relay 266 is energized and the lamp 265 extinguished.

When the receiver at substation A is hung up after the conversation is completed the relay 266 deënergizes and again lights lamp 265. When the called subscriber hangs up his receiver the current in relay 40 is restored to its original direction and the lamp 41 lighted. The operator then removes the plugs P' and $P^2$ from their jacks, whereupon all the apparatus used in the connection is restored to normal position. The removal of plug $P^2$ from jack $J^2$ breaks the circuit of the line relay 183 of repeater E', which deënergizes and breaks the circuits of relay 190 and the line relay 70 of the connector. The relay 70, upon deënergizing, breaks the circuit of relay 215, which in turn deënergizes and closes the circuit of the release magnet 63. This circuit extends from ground $G^{16}$ through springs 216 and 223, 224 and 267, 268 and 269 and magnet 63 to battery. The magnet 63, upon energizing, operates to release the connector, whereupon its own circuit is broken at the springs 268 and 269 when the switch shaft reaches its lowest position.

When the relay 190 of the repeater E' deënergizes it breaks the circuit of the relay 180 of the selector F', whereupon the circuit of the release magnet 270 is closed. This circuit extends from ground $G^9$ through springs 157 and 160, 161 and 314, 271 and 272, 273 and 274 and magnet 270 to battery. The magnet 270, upon energizing, releases the selector and its own circuit is broken at springs 273 and 274 when the shaft reaches its lowest position.

When the subscriber at the automatic substation removes his receiver to make a call, the line switches $C^2$ and $C^3$ operate in the same manner as explained for the switches C and C' (Fig. 1) to extend the connection to a trunk line which leads through a repeater E to a selector F (Fig. 3). If the subscriber at substation A' wishes to signal the operator, he then operates his calling device for the digit corresponding to the selector level to which are connected the trunks H. The repeater E operates in the same manner as has been explained for repeater E' to repeat the impulses to the selector F. The selector F operates in the same manner as has been explained for selector F' to extend the connection to an idle trunk H. The relay 275 thereupon becomes energized over a circuit extending from ground $G^{22}$ through the lower winding of said relay, contact 276, wiper 43, thence over the heavy conductors to and through substation A' and back over the other side of the line to wiper 42, thence through contact 277 and upper winding of relay 275 to battery. The relay 275, upon energizing, operates to close a circuit from ground $G^{23}$ through the lower winding of relay 278, springs 279 and 280, lower winding of relay 281, springs 282 and 283, 284 and 285 and upper winding of relay 278 to battery. The relay 278, upon energizing, closes the circuit of lamp 286 to signal the operator. The combined energization of relays 275 and 281 provides a guarding potential at the selector private bank contacts of the trunk and completes a circuit from ground $G^{24}$ through the upper winding of relay 281, springs 287 and 288, 289 and 290, private wiper 44, side switch wiper 48, contact point $289^a$, relay $290^a$, contact point 291 and wiper 47 to the battery lead. This circuit maintains the relay $290^a$ energized after the selector has operated. The upper winding of relay 281 has a low resistance and a small number of turns, so that it alone will not cause relay 281 to operatively energize. Its function will be explained later. The operator is enabled to determine the character of the line calling in the following manner: It will be seen that the circuit by means of which the switch $C^2$ is held in its operated position extends from ground $G^{25}$ at repeater E through the right-hand winding of coil 292, springs 293 and 294, 295 and 296, 297 and 298, 299 and $300^a$, winding 235 and secondary winding of induction coil 236 to the battery. At the repeater the left-hand winding of coil 292 is included in a bridge across the conductors 300 and 301, which are now connected through the selector F to the operator's trunk. Thus, the test tone current flowing from induction coil 236 through the right-hand winding of coil 292 induces a current in the line which will be heard by the operator when she connects her talking set with the line to answer the call. After the calling subscriber has given his order to the operator he hangs up his receiver, releasing the automatic switches brought into use by him and the operator sets up the desired connection by calling back onto the calling line and plugging into the called line in the reverse manner, as explained when subscriber A called.

It will be evident that the trunks leading from the switches $C^3$ might lead direct to selectors F without going through a repeater E—that is, the conductors 300 and 301 might be connected directly to the line switch bank springs 302 and 303. The bank spring 297 would then be connected to the contact point $289^a$ in the selector, and the holding circuit of the line switch $C^2$ would then include the upper winding of relay 281 at the trunk H instead of the right-hand winding of coil 292 at repeater E. The tone test current would then pass to the line through the lower winding of relay 281. In this case the operator could, if she so desired, disconnect this tone test current from the line while conversing with the calling subscriber. By throwing the key $K^4$ to the right the relay 278 is disconnected from the line when the operator's talking set is connected therewith. The relay 281 would then deënergize and cut its upper winding out of the circuit of induction coil 236, thereby removing the test tone from the line.

In describing how the substation A' is called through the connector L it was assumed that the called line was idle. In case the called line had been busy the connector L would not have completed connection with the line and the operator would have been given a busy signal as follows: Whenever a line is busy there is a guarding ground potential on its connector private bank contacts. When the wiper 59 engages a contact which is thus grounded a circuit is completed through side switch wiper 68 (which is then in second position), contact point 305 and lower winding of relay 306 to battery. The relay 306, upon energizing, completes a circuit from ground $G^{26}$ through the springs 307 of the relay 215, springs 308 and upper winding of the relay 306 and private magnet 62 to battery. This circuit maintains the private magnet energized after the slow relay 226 deënergizes. Since the private magnet does not deënergize after the last digit is called, the side switch remains in second position and connection is not completed with the busy line. The relay 306 is also locked through its upper winding independently of the guarding potential at the private bank contact, and in its energized position the relay 306 completes a busy signaling circuit from the busy signaling machine N through the springs 309, side switch wiper 67 (in second position), thence over the heavy conductors to the cord O, through the talking set, or through the cord to the calling line, as the case might be, and back over the other side of the line, through the upper winding of the connector line relay 70 to the battery lead 227, and thence back to the machine N. The apparatus is released from this position in the same manner as when an idle line is called.

In Figs. 8 and 9 there is shown a connection established through the medium of apparatus embodying the same principles as embodied in Fig. 1, with the exception that in Figs. 8 and 9 the operator is notified of the character of the calling line by a visual rather than by an audible signal. The substation $A^2$ is shown provided with a meter R which is controlled by the operator at the central office through the medium of the magnet 320. The line $A^3$ is shown without a meter. The circuits of the line switches $C^4$ and $C^6$ of the lines $A^2$ and $A^3$ are so arranged that when the line $A^2$ calls, the lamp 321 at the operator's cord T will be lighted, but when the line $A^3$ calls, the lamp will not be lighted. The line switch $C^4$ differs somewhat from the line switch C (Fig. 1) in that the line and cut-off relays are separated from the switch proper. These relays are very similar in their connections and functions to the usual line and cut-off relays in manual switchboard systems and, if desired, may be located on the manual board in the usual manner instead of on the switch $C^4$.

When the subscriber at substation $A^2$ removes his receiver from the hook preparatory to making a call, a circuit is closed extending from ground $G^{30}$ through the springs 324 and 325 of the cut-off relay 323, line conductor 326, switch hook, transmitter and receiver at the substation $A^2$, line 327, springs 328 and 329 and line relay 322 to the battery lead 330, thence through the battery B' to ground G. The relay 322, upon energizing, completes a circuit extending from ground $G^{31}$ through springs 331 and 332, windings 333 and 334 of switch $C^4$, springs 335 and 336, contact point 338 and armature 339 to the battery lead. The magnet 340, upon energizing, forces its plunger into the bank, forcing the springs 341-348 into contact. The engagement of the springs 345 and 346 completes a circuit for the winding 349 of switch $C^5$, which circuit extends from ground $G^{31}$ through the springs 331 and 332, 345 and 346, winding 349, springs 351 and 352, armature 354 and its front contact, contact point 355, armature 360, contact point 361 and armature 362 to the battery lead 330. The winding 349, upon energizing, attracts the plunger arm of the switch $C^5$, which operates to extend the connection to the cord circuit T. As soon as connection is extended to the cord T the relays 365 and 366 are energized over a circuit extending from ground $G^{32}$ through relay 365, trunk conductor 367, springs 368 and 369, 342 and 341, thence to and through the substation and back over the other side of the line, through springs 343 and 344, 370 and 371, and relay 366 to the battery lead 330. The relay 366, upon energizing, completes a circuit for the answering supervisory lamp 363, said circuit extending from ground $G^{33}$ through springs 372 and 373, 374 and 375 and lamp 363 to the battery lead.

It will be seen that when connection is extended to the cord T a circuit is also closed for the cut-off relay 323 of the calling line, this circuit extending from ground $G^{31}$, through said relay 323, springs 347 and 348 of switch $C^4$, springs 376 and 377 of switch $C^5$ and resistance 378 to battery. The relay 323, upon energizing, operates to disconnect the relay 322 from the line, which relay thereupon deënergizes and disconnects the ground $G^{31}$ from the switches $C^4$ and $C^5$. After this ground $G^{31}$ is disconnected, switches $C^4$ and $C^5$ are maintained in their operated positions by a circuit which extends from ground $G^{34}$ at the cord T through lamp 321, springs 379 and 380 of relay 381, springs 382 and 383 of relay 365, relay 384, and springs 385 and 386, thence one branch of the circuit extends through the winding 349 of switch $C^5$, springs 351 and 353 and winding 486 to battery, while a second branch passes through the springs 346 and 345 of the switch $C^4$ and through the windings 333 and 334, springs 335 and 337 to the battery lead. Since this holding circuit includes both windings 333 and 334 of the switch $C^4$ in multiple, sufficient current flows through the lamp 321 at the cord T to cause it to glow.

The glowing of the lamp 363 signifies to the operator that someone is calling, while the glowing of lamp 321 signifies that the call comes from a line provided with a meter.

When the switches $C^4$ and $C^5$ operate, their master switches $D^3$ and $D^4$ operate in the same manner as explained for the master switches D and D'. The relays 390 and 391, which correspond to the relays 122 and 125 in Fig. 1, are energized by the same ground $G^{34}$ which completes the holding circuit for the switches $C^4$ and $C^5$.

It has now been explained how the switches $C^4$ and $C^5$ are operated to extend connection to a cord T and the answering supervisory lamp 363 is lighted. When this occurs the operator operates the key $K^3$ (Fig. 9) to connect the operator's set S' with the cord and inquires the line wanted. Upon receiving the number, the operator restores the key $K^8$ and inserts the plug $P^6$ into the jack $J^6$ of the line called for. A circuit is thereupon closed from ground $G^{35}$ through the cut-off relay 392 of line $A^3$, sleeve conductors of jack $J^6$ and plug $P^6$, conductor 393, lamp 394 and relay 395 to battery $B'$. The relay 392 is energized over this circuit to disconnect the relay 396 from the line, lamp 394 is lighted and relay 395 operates to break the circuit of lamp 363. The operator rings the called subscriber by pressing the key $K^8$ to the right to bridge the generator across the line in the usual manner. When the called subscriber answers, a circuit is closed from ground $G^{36}$ at the cord T, through relay 397, conductor 398, plug $P^6$ and jack $J^6$, line 399, transmitter and receiver at substation $A^3$, line 400, jack $J^6$ and plug $P^6$, conductor 401 and impedance coil 402 to battery. The relay, 397, upon energizing, closes a shunt around lamp 394, which thereupon ceases to glow to signify to the operator that the called subscriber has answered.

It will be remembered that the lamp 321 in the operator's cord was lighted when connection was first extended to the cord. This signifies to the operator that the calling line is provided with a meter. In order to record the connection on the meter R the operator momentarily depresses the key $K^9$. It will be seen that the left-hand winding of the meter magnet 320 of the calling line is included in circuit in multiple with the cut-off relay 323 and, therefore, in series with the resistance 378 at the cord T. This resistance does not permit sufficient current to flow to operate the magnet 320. When the key $K^9$ is depressed, however, the magnet 320 is connected with the battery $B^2$ through the magnet 403. This permits the magnet 320 to operate and also energizes the magnet 403. The magnet 320, upon energizing, operates the meter R and closes the circuit of its own right-hand winding so that it remains in its operated position after the key $K^9$ is opened. The magnet 403, upon energizing, makes a duplicate record of the call on the meter $R'$ and also connects the relay 381 in multiple with the lamp 321. The relay 381, upon energizing, disconnects the lamp 321 and leaves itself in an energizing circuit extending from ground $G^{37}$ through the relay 381, springs 404 and 380 and thence to battery through the switches $C^5$ and $C^4$, as traced for the lamp 321. It is thus seen that the lamp which signifies to the operator that the calling line is a metered line is extinguished as soon as the call is registered.

When the conversation is completed the operator is given one disconnect signal when the called subscriber hangs up his receiver, thereby breaking the circuit of the relay 397, which deënergizes and removes the shunt from the lamp 394. A second disconnect signal is given when the calling subscriber hangs up his receiver and allows relays 365 and 366 to deënergize. The deënergization of relay 365 has no effect, because its springs remain short-circuited by the springs 405 of relay 395. The relay 366, upon deënergizing, again closes the circuit of lamp 363, since the springs 372 and 406 are now in contact. The operator now removes the plug $P^6$ from the jack $J^6$, which disconnects the two lines and breaks the circuit of the lamp 396 and the relay 395 at the cord. The relay 395, upon deënergizing, breaks the circuit of lamp 363 and opens the holding circuits of the switches $C^4$ and $C^5$, which thereupon allow their plungers to be withdrawn from their banks. The release of the switches $C^4$ and $C^5$ breaks the circuits of the cut-off relay 323 and of the meter magnet 320, and all apparatus employed in the connection is restored to normal position.

It having been explained how the lamp 321 is lighted to signify to the operator when a call comes from a line having a meter, it will now be pointed out what changes may be made in the equipment of lines which have no meter in order that this lamp shall not light when a call comes from such a line. Comparing the line switch $C^4$ (Fig. 8) with the switch $C^6$ (Fig. 9) it will be seen that the windings 333 and 334 of the switch $C^4$ are permanently connected in multiple. In the switch $C^6$, however, the winding 407 is adapted to be energized alone when the line relay 396 is first energized. After the switch has operated, however, the windings 407 and 408 are connected in series with the battery lead 330. Thus it will be seen that when the subscriber $A^3$ makes a call the lamp 321 at the seized operator's cord is connected to battery at the switch $C^6$ through the two windings of said switch in series, instead of in multiple as in the case of the switch $C^4$. This does not permit sufficient current to flow through the lamp 321 to cause it to glow. It will be seen that, although, as shown in the drawings, the lamp 321 is lighted when the line with the meter calls, and is not lighted when the line without a meter calls, the meter itself has nothing to do with the discriminating operation of said lamp.

The cord T is provided with a key $K^{10}$. The function of this key is to put a guarding potential on the master switch bank contact of its trunk if for any reason it is desired that no calls shall come in over this trunk. It is evident that when the key is operated the springs 410 and 411 operate in the same manner as the springs 382 and 383 of the relay 365 to connect the ground $G^{34}$ with the master switch contact point 412. Since this provides the contact point 412 with a guarding potential without energizing the relay 384, the key K¹⁰ is provided with a pair of springs 417 which perform the same function as said relay. It should be stated here that the ground G³⁸ which is shown connected with the key K¹⁰, and therefore with a spring of the relay 384, would be omitted on all except the end relay of the chain which controls the relay 413, since the circuit of this relay is to be closed only when all the relays 384 of the series are energized, or the keys K¹⁰ corresponding thereto are operated. In case it is desired to decrease the number of operators on duty during periods of light load, certain operators may leave their positions, and by depressing all the keys K¹⁰ thereat may prevent any further calls from coming in on their trunks and thus concentrate all the traffic upon the remaining operators' positions. In order to insure that no plunger shall be left standing in position to engage the trunk after the key K¹⁰ is pressed, the master switch D⁴ should be caused to make a complete cycle of its operation so as to pick up all the idle plungers which it controls, and bring them into locking engagement with the plunger shaft. This may be done by pressing the key K¹² for a short time, whereby the relay 415 is energized to close the circuit of the starting relay 391.

As shown herein, the operator's cord T is provided with a meter R² which may be used to keep count of ineffective calls or for any other purpose desired.

From the foregoing it will be seen that the operator may know instantly when answering the call whether the same is from a measured service line or one of opposite character. There are, it will be seen, as many different indicating expedients as there are different kinds of lines. The absence of any signal at all may be the expedient for indicating lines of one character.

What I claim as my invention is:—

1. In a telephone system, lines equipped for giving measured service, lines equipped for giving unmeasured service, a manual switchboard at which calls from said lines are answered, and automatic means for indicating to the operator the character of the line calling.

2. In a telephone system, a plurality of telephone lines of different kinds, means by which an operator may answer calls from any of said lines, and automatic means for indicating to the operator upon answering the character of the line calling.

3. In a telephone system, lines equipped for giving measured service, lines equipped for giving unmeasured service, a manual switchboard at which calls from said lines are answered, and automatic means for indicating to the operator the character of the line calling, said automatic means comprising mechanism for producing an audible signal when the operator answers the call.

4. In a telephone system, a plurality of telephone lines of different kinds, means comprising a receiver and a centralized source of current by which an operator may answer calls from any of said lines, and means for indicating to the operator the character of the line calling, said means common to a plurality of lines.

5. In a telephone system, lines equipped for giving measured service, lines equipped for giving unmeasured service, a manual switchboard at which calls from said lines are answered, and automatic means for indicating to the operator the character of the line calling, some of said lines having trunking switches with coils allotted thereto, and said automatic means comprising circuits that include coils of said switches.

6. In a telephone system, a plurality of telephone lines of different kinds, means by which an operator may answer calls from any of said lines, and automatic means for indicating to the operator the character of the line calling, some of said lines having trunking switches with coils allotted thereto, and said automatic means comprising circuits that include coils of said switches.

7. In a telephone system, lines equipped for giving measured service, lines equipped for giving unmeasured service, a manual switchboard at which calls from said lines are answered through the medium of a receiver and a centralized source of current, means for indicating to the operator the character of the line calling, said means common to a plurality of lines, and means controlled at the switch-board for controlling the measured service equipment of the calling line.

8. In a telephone system, lines equipped for giving measured service, lines equipped for giving unmeasured service, a manual switchboard at which calls from said lines are answered through the medium of a receiver and a central battery, means common to a plurality of lines for indicating to the operator the character of the line calling, trunks leading to the operator's position, and switches for automatically connecting calling lines to idle trunks.

9. In a telephone system, a plurality of telephone lines of different kinds, means comprising a receiver and a central battery by which an operator may answer calls from any of said lines, means common to a plurality of lines for indicating to the operator upon answering the character of the line calling, trunks leading to the operator's position, and switches for automatically connecting calling lines to idle trunks.

10. In a telephone system, lines equipped for giving measured service, lines equipped for giving unmeasured service, a manual switchboard at which calls from said lines are answered through the medium of a receiver and a central battery, means common to a plurality of lines for indicating to the operator the character of the line calling, and automatic switches controlled over the two sides of the calling line in series.

11. In a telephone system, a plurality of telephone lines of different kinds, means comprising a receiver and a central battery by which an operator may answer calls from any of said lines, means common to a plurality of lines for indicating to the operator upon answering the character of the line calling, and automatic switches controlled over the two sides of the calling line in series.

12. In a telephone system, lines equipped for giving measured service, lines equipped for giving unmeasured service, a manual switchboard at which calls from said lines are answered through the medium of a receiver and a central battery, means common to a plurality of lines for indicating to the operator the character of the line calling, and means automatically controlled by the operator for extending a calling connection to the called line.

13. In a telephone system, a plurality of telephone lines of different kinds, means comprising a receiver and a central battery by which an operator may answer calls from any of said lines, means common to a plurality of lines for indicating to the operator the character of the line calling, and means automatically controlled by the operator for extending a calling connection to the called line.

14. In a telephone system, lines equipped for giving measured service, lines equipped for giving unmeasured service, a manual switchboard at which calls from said lines are answered through the medium of a receiver and a central source of electrical energy, means common to a plurality of lines for indicating to the operator the character of the line calling, said central source of electrical energy for supplying talking current to said lines.

15. In a telephone system, lines equipped for giving measured service, lines equipped for giving unmeasured service, a manual switchboard at which calls from said lines are answered through the medium of a receiver and a central battery, means common to a plurality of lines for indicating to the operator the character of the line calling, and signals by which calling subscribers indicate to the operator that a connection is wanted, said signals being each common to a plurality of lines.

16. In a telephone system, a plurality of telephone lines of different kinds, means comprising a receiver and a central battery by which an operator may answer calls from any of said lines, means common to a plurality of lines for indicating to the operator upon answering the character of the line calling, and signals by which calling subscribers indicate to the operator that a connection is wanted, said signals being each common to a plurality of lines.

17. In a telephone system, lines equipped for giving measured service, lines equipped for giving unmeasured service, a manual switchboard at which calls from said lines are answered through the medium of a receiver and a central battery, means common to a plurality of lines for indicating to the operator the character of the line calling, flexible connecting cords on said board, and means controlled over calling lines for automatically selecting idle cords.

18. In a telephone system, a plurality of telephone lines of different kinds, means comprising a receiver and a central battery by which an operator may answer calls from any of said lines, means common to a plurality of lines for indicating to the operator upon answering the character of the line calling, flexible connecting cords at the operator's position, and means controlled over calling lines for automatically selecting idle cords.

19. In a telephone system, a plurality of subscribers' lines of different characters, a manual switchboard at which calls from said lines are answered through the medium of a receiver and a central battery, a plurality of trunks extending between said lines and said switchboard, an automatic switch for selecting an idle trunk, and signaling apparatus associated with said switch for indicating to the operator the character of the line calling, said apparatus being common to a plurality of said lines.

20. In a telephone system, a plurality of subscribers' lines of different characters, a manual switchboard at which calls from said lines are answered, a plurality of trunks extending between said lines and said switchboard, a non-numerical switch individual to the subscribers' lines for selecting an idle trunk, and a signal associated with said switch for indicating to the operator the character of the line calling.

21. In a telephone system, a plurality of subscribers' lines of different characters, a manual switchboard at which calls from said lines are answered, a signal common to a plurality of said lines by which the calling subscribers indicate to the operator that a connection is desired, and a second signal individual to said lines for indicating the character of the line calling.

22. In a telephone system, a plurality of subscribers' lines of different characters, a manual switchboard at which calls from said lines are answered, trunk lines extending between said calling lines and said switchboard, a trunking switch for selecting an idle trunk, a tone test associated with said switch for indicating to the operator the character of the line calling, and a signal common to a plurality of said lines by which calling subscribers indicate to the operator that a connection is desired.

23. In a telephone system, a plurality of subscribers' lines of different characters, a manual switchboard at which calls from said lines are answered, a plurality of trunk lines extending between said calling lines and said switchboard, an automatic trunk-selecting switch for selecting an idle trunk, an operating magnet for said switch, and a tone test having a coil connected in series with a winding of said operating magnet for producing a tone test to indicate to the operator the character of the line calling.

24. In a telephone system, a plurality of subscribers' lines of different characters, a manual switchboard at which calls from said lines are answered, a plurality of trunk lines extending between said calling lines and said switchboard, an automatic trunk-selecting switch for selecting an idle trunk, an operating magnet for said switch, a tone test having a coil connected in series with a winding of said operating magnet for producing a tone test, and means for transmitting said tone over a third conductor of the selected trunk to indicate to the operator the character of the line calling.

25. In a telephone system, a plurality of subscribers' lines, a manual switchboard, trunk lines leading to said switchboard, and means including primary and secondary non-numerical trunk-selecting switches for automatically extending the connection from a subscriber's line to an idle trunk extending to said switchboard.

26. In a telephone system, a plurality of subscribers' lines, a manual switchboard, non-numerical switches individual to said subscribers' lines, trunk lines extending from said switches, means controlled by said switches for connecting said subscribers' lines with an idle one of said trunks, secondary non-numerical switches at the opposite end of said trunks, trunk lines terminating in said manual board, and means controlled by said secondary non-numerical switches for extending the connection over an idle trunk to said manual switchboard.

27. In a telephone system, a plurality of lines divided into groups, a manual switchboard, a plurality of links extending to different sections of said board and terminating in manually-controlled terminals, and automatically-operated trunk-selecting mechanism operable for connecting the links with the lines upon two consecutive non-numerical trunking operations.

28. In a telephone system, a non-numerical trunk-selecting switch comprising separate and distinct line and cut-off relays and a separate operating magnet, said operating magnet comprising a pull-down winding and a hold-down winding.

29. In a telephone system, a non-numerical switch, a trunk line, and a plunger operated by said switch for connecting with an idle trunk, said switch comprising a separate line and cut-off relay and a separate operating magnet, said operating magnet comprising a winding for operating said plunger and a second holding winding for maintaining said plunger in operated position.

30. In a telephone system, a plurality of telephone lines of different kinds, means including automatic switches and an operator's board for establishing a connection between two of said lines, means comprising a receiver and a central battery by which an operator may answer calls from any of said lines, and means common to a plurality of said lines for indicating to the operator the character of any line calling.

31. In a telephone system, a plurality of telephone lines of different kinds, means comprising a receiver and a central battery by which an operator may answer calls from any of said lines, means common to a plurality of said lines for indicating to the operator the character of any line calling, trunks leading to the operator's position and accessible to the subscribers for connecting with the operator, and means for automatically connecting calling lines to idle trunks.

32. In a telephone system, a plurality of telephone lines of different kinds, means comprising a receiver and a central battery by which an operator may answer calls from any of said lines, means common to a plurality of said lines for indicating to the operator the character of any line calling, and automatic switches controlled over the two sides of the calling line in series.

33. In a telephone system, a plurality of telephone lines of different kinds, means comprising a receiver and a central battery by which an operator may answer calls from any of said lines, and means common to a plurality of said lines electrically associated with the terminal of the line at the central office for indicating to the operator the character of the line calling, said means comprising mechanism for producing an audible signal when the operator answers the call.

34. In a telephone system, lines equipped for giving measured service, lines equipped for giving unmeasured service, a manual switchboard at which calls from said lines are answered through the medium of a receiver and a central battery, and means common to a plurality of said lines electrically associated with the terminal of the line at the central office for indicating to the operator the character of the line calling, said means comprising a device for giving the operator a signal responsive to the answering of the call.

35. In a telephone system, a plurality of telephone lines of different kinds, means comprising a receiver and a central battery by which an operator may answer calls from any of said lines, and means common to a plurality of said lines electrically associated with the terminal of the line at the central office for indicating to the operator the character of the line calling, said means comprising a device for giving the operator a signal responsive to the answering of the call.

36. In a telephone system, lines equipped for giving measured service, lines equipped for giving unmeasured service, a manual switchboard at which calls from said lines are answered through the medium of a receiver and a central battery, means common to a plurality of said lines electrically associated with the terminal of the line at the central office for indicating to the operator the character of the line calling, trunks leading to the operator's position, and switches for automatically connecting calling lines to idle trunks.

37. In a telephone system, a plurality of telephone lines of different kinds, means comprising a receiver and a central battery by which an operator may answer calls from any of said lines, means common to a plurality of said lines electrically associated with the terminal of the line at the central office for indicating to the operator upon answering the character of the line calling, trunks leading to the operator's position, and switches for automatically connecting calling lines to idle trunks.

38. In a telephone system, lines equipped for giving measured service, lines equipped for giving unmeasured service, a manual switchboard at which calls from said lines are answered through the medium of a receiver and a central battery, means common to a plurality of said lines electrically associated with the terminal of the line at the central office for indicating to the operator the character of the line calling, and automatic switches controlled over the two sides of the calling line in series for trunking to an operator's position.

39. In a telephone system, a plurality of telephone lines of different kinds, means comprising a receiver and a central battery by which an operator may answer calls from any one of said lines, means common to a plurality of said lines electrically associated with the terminal of the line at the central office for indicating to the operator upon answering the character of the line calling, and automatic switches controlled over the two sides of the calling line in series for trunking to an operator's position.

40. In a telephone system, lines equipped for giving measured service, lines equipped for giving unmeasured service, a manual switchboard at which calls from said lines are answered through the medium of a receiver and a central battery, means common to a plurality of said lines electrically associated with the terminal of the line at the central office for indicating to the operator the character of the line calling, and means automatically controlled by the operator for extending a calling connection to the called line.

41. In a telephone system, a plurality of telephone lines of different kinds, means comprising a receiver and a central battery by which an operator may answer calls from any of said lines, means common to a plurality of said lines electrically associated with the terminal of the line at the central office for indicating to the operator the character of the line calling, and means automatically controlled by the operator for extending a calling connection to the called line.

42. In a telephone system, lines equipped for giving measured service, lines equipped for giving unmeasured service, a manual switchboard at which calls from said lines are answered through the medium of a receiver and a source of electrical energy, means common to a plurality of said lines electrically associated with the terminal of the line at the central office for indicating to the operator the character of the line calling, said central source of electrical energy for supplying talking current to said line.

43. In a telephone system, lines equipped for giving measured service, lines equipped for giving unmeasured service, a manual switchboard at which calls from said lines are answered through the medium of a receiver and a central battery, means common to a plurality of said lines electrically associated with the terminal of the line at the central office for indicating to the operator the character of the line calling, and signals by which calling subscribers indicate to the operator that a connection is wanted, said signals being each common to a plurality of lines.

44. In a telephone system, a plurality of telephone lines of different kinds, means comprising a receiver and a central battery by which an operator may answer calls from any of said lines, means common to a plurality of said lines electrically associated with the terminal of the line at the central office for indicating to the operator upon answering the character of the line calling, and signals by which calling subscribers indicate to the operator that a connection is wanted, said signals being each common to a plurality of lines.

45. In a telephone system, a plurality of subscribers' lines, individual call registers for certain of said lines, a manual switchboard provided with a common apparatus for receiving calls from said lines, and a signal individual to said apparatus operated only by a calling line provided with a register.

46. In a telephone system, a plurality of subscribers' lines, individual call registers for certain of said lines, a manual switchboard provided with a common apparatus for receiving calls from said lines, and a discriminating signal individual to said apparatus for indicating to the operator whether a calling line is provided with a register or not.

47. In a telephone system, a plurality of subscribers' lines of different kinds, a manual switchboard provided with a common apparatus for receiving calls from said lines, and a discriminating signal individual to said apparatus for indicating to the operator the character of the calling line every time a call is answered.

48. In a telephone system, a plurality of subscribers' lines of two kinds, one kind provided with individual call registers and the other kind not so provided, a manual switchboard for receiving and answering calls from said lines, and a discriminating signal common to lines of both kinds for indicating to an operator the character of a calling line.

49. In a telephone system, a plurality of lines of two different characters, the lines of one character provided each with a call register and the lines of the other character not so provided, trunk lines extending to a manual switchboard, means for extending calling lines to idle trunk lines, and a discriminating signal associated with each trunk line for indicating to the operator the character of a calling line.

50. In a telephone system, a plurality of lines of two different characters, the lines of one character provided each with a call register and the lines of the other character not so provided, trunk lines extending to a manual switchboard, means including an automatic switch individual to each of said lines for extending calling lines to idle trunk lines, and a discriminating signal associated with each trunk line for indicating to the operator the character of a calling line.

51. In a telephone system, a plurality of lines of two different characters, the lines of one character provided each with a call register and the lines of the other character not so provided, trunk lines extending to a manual switchboard, a plurality of automatic switches for extending calling lines to idle trunk lines, and a discriminating signal associated with each trunk line for indicating to the operator the character of a calling line.

52. In a telephone system, a plurality of lines of two different characters, the lines of one character provided each with a call register and the lines of the other character not so provided, trunk lines extending to a manual switchboard, means for extending calling lines to idle trunk lines, and a discriminating signal associated with each trunk line for indicating to the operator the character of a calling line, means for connecting calling lines with called lines by way of said trunk lines, and manually controlled means in each trunk line for actuating the call register of a calling line extended thereto.

53. In a telephone system, a plurality of lines of two different characters, the lines of one character provided each with a call register and the lines of the other character not so provided, trunk lines extending to a manual switchboard, means including an automatic switch individual to each of said lines for extending calling lines to idle trunk lines, a discriminating signal associated with each trunk line for indicating to the operator the character of a calling line, means for connecting calling lines with called lines by way of said trunk lines, and manually controlled means in each trunk line for actuating the call register of a calling line extended thereto.

54. In a telephone system, a plurality of lines of two different characters, the lines of one character provided each with a call register and the lines of the other character not so provided, trunk lines extending to a manual switchboard, a plurality of automatic switches for extending calling lines to idle trunk lines, a discriminating signal associated with each trunk line for indicating to the operator the character of a calling line, means for connecting calling lines with called lines by way of said trunk lines, and manually controlled means in each trunk line for actuating the call register of a calling line extended thereto.

55. In a telephone system, a plurality of lines of different character, a trunk line and a signal associated therewith, means including an automatic switch for extending calling lines to said trunk line, a circuit for said signal, a source of current for said circuit, means associated with each of said lines for closing said circuit when its associated line is extended to said trunk line, said means of different resistance in lines of different character, whereby the flow of current in said circuit and the operation of said signal is made to depend upon the character of line extended to said trunk line.

56. In a telephone system, a plurality of lines of different character, a trunk line and a visual signal associated therewith, means including an individual line switch for each line for extending calling lines to said trunk line, a circuit for said signal including a conductor of said trunk line, a pair of windings in the individual line switch of each line included in said circuit when the line switch is operated, said windings differently connected for lines of different character and whereby the operation of said signal is made to depend upon the character of line extended to its associated trunk line.

57. In a telephone system, a plurality of lines of a certain character, a second plurality of lines of a different character, each line of said second plurality provided with a call register, a trunk line extending to a manual switchboard, means including an individual line switch for each line for extending calling lines to said trunk line, two circuits each including a conductor of said trunk line, a discriminating signal controlled over one of said circuits for indicating to an operator the character of a calling line, and manually controlled means for actuating the call register of a calling line over the other circuit.

58. In a telephone system, a plurality of lines of a certain character, a second plurality of lines of a different character, each line of said second plurality provided with a call register, a trunk line extending to a manual switchboard, means including an individual line switch for each line for extending calling lines to said trunk line, a circuit including a conductor of said trunk line for controlling the release of a line switch connected thereto, a second circuit also including a conductor of said trunk line for controlling the call register of a calling line connected thereto, a discriminating signal controlled over said first circuit to indicate to an operator the character of a calling line, and manually controlled means for actuating the call register of a calling line over said second circuit, substantially as described.

59. In a telephone system, a plurality of lines of a certain character, a second plurality of lines of a different character, each line of said second plurality provided with a call register, a trunk line extending to a manual switchboard, means including an individual line switch for each line for extending calling lines to said trunk line, a circuit including a third conductor of said trunk line for controlling the release of any line switch connected thereto, and a discriminating signal controlled over said circuit for indicating to an operator the character of a calling line.

60. In a telephone system, a plurality of lines of a certain character, a second plurality of lines of a different character, each line of said second plurality provided with a call register, a trunk line extending to a manual switchboard, means including an individual line switch for each line for extending calling lines to said trunk line, a circuit including a third conductor of said trunk line, and a disconnecting signal controlled over said circuit for indicating to an operator the character of the calling line.

61. In a telephone system, a plurality of lines of a certain character, a second plurality of lines of a different character, each line of said second plurality provided with a call register, a trunk line extending to a manual switchboard, means including an individual line switch for each line for extending calling lines to said trunk line, a circuit including a third conductor of said trunk line, and a disconnecting signal controlled over said circuit for indicating to an operator the character of a calling line, a source of current for said circuit, means associated with lines of one character for permitting current of a certain value to flow in said circuit and means associated with lines of the other character for permitting current of a different value to flow in said circuit, whereby said signal may be controlled.

62. In a telephone system, a calling and a called line, each provided with a meter, means including a plurality of automatic switches for completing a talking connection between said lines, two circuits coexistent with said talking circuit but exclusive of conductors included therein, means for controlling the release of said switches over one of said circuits, means for maintaining a normal flow of current in the other circuit and means for controlling the meter of the calling line over the said other circuit by increasing the current flow therein.

63. In a telephone system, a calling and a called subscriber's line, a meter for the calling line, a trunk line extending to an operator's position, an automatic switch for extending the calling line to said trunk line, means for establishing a talking connection between the calling and called lines by way of said trunk line, a circuit for said meter over a conductor of said trunk line not included in the talking connection, a source of current for said circuit normally inadequate for operating said meter, and means for increasing the current flow in said circuit to effect such operation.

64. In a telephone system, a plurality of lines each provided with a meter, trunk lines extending to an operator's position, means including an automatic switch for extending a line when calling to an idle trunk line, means for completing a connection between a calling line so extended and a called line by way of two conductors of said trunk, a circuit for the meter of the connected calling line over a third conductor of said trunk line, a source of current for said circuit normally inadequate for operating said meter and means for increasing the current flow in said circuit to effect such operation.

65. In a telephone system, a calling and a called subscriber's line, a meter for the calling line, a trunk line extending to an operator's position, an automatic switch for extending the calling line to said trunk line, means for establishing a talking connection between the calling and called line by way of said trunk line, a circuit for said meter over a conductor of said trunk line not included in the talking connection, a source. of current for said circuit, said meter remaining normally inoperative, a second source of current, and means for including said second source in the circuit to operate said meter.

66. In a telephone system, a plurality of lines each provided with a meter, trunk lines extending to an operator's position, means including an automatic switch for extending a line when calling to an idle trunk line, means for completing a connection between a calling line so extended and a called line by way of two conductors of said trunk line, a circuit for the meter of the connected calling line over a third conductor of said trunk line, a source of current for said circuit, said meter remaining normally inoperative, a second source of current, and means for including said second source in the circuit to operate said meter.

67. In a telephone system, a calling and a called subscriber's line, a meter for the calling line, a trunk line extending to an operator's position, an automatic switch for extending the calling line to said trunk line, means for establishing a talking connection between the calling and called lines by way of said trunk line, a circuit for said meter over a conductor of said trunk line not included in the talking connection, said last means manually controlled from the said operator's position.

68. In a telephone system, a plurality of lines each provided with a meter, trunk lines extending to an operator's position, means including an automatic switch for extending a line when calling to an idle trunk line, means for completing a connection between a calling line so extended and a called line by way of two conductors of said trunk line, a circuit for the meter of the connected calling line over a third conductor of said trunk line, said last means manually controlled from the said operator's position.

69. In a telephone system, a calling and a called subscriber's line, a meter for the calling line, a trunk line extending to an operator's position, an automatic switch for extending the calling line to said trunk line, means for establishing a talking connection between the calling and called line by way of said trunk line, a circuit for said meter over a conductor of said trunk line not included in the talking connection, a source of current for said circuit, said meter remaining normally inoperative, a second source of current, and means for including said second source in the circuit to operate said meter, said last means manually controlled from the said operator's position.

70. In a telephone system, a calling and a called subscriber's line, a meter for the calling line, a trunk line extending to an operator's position, an automatic switch for extending the calling line to said trunk line, means for establishing a talking connection between the calling and called lines by way of said trunk line, a circuit for said meter over a conductor of said trunk line not included in the talking connection, a source of current for said circuit normally inadequate for operating said meter, means for increasing the current flow in said circuit to effect such operation and means whereby said meter when operated to register the connection is automatically rendered inoperative until the next succeeding connection.

71. In a telephone system, a plurality of lines each provided with a meter, trunk lines extending to an operator's position, means including an automatic switch for extending a line when calling to an idle trunk line, means for completing a connection between a calling line so extended and a called line by way of two conductors of said trunk line, a circuit for the meter of the connected calling line over a third conductor of said trunk line, a source of current for said circuit normally inadequate for operating said meter means for increasing the current flow in said circuit to effect such operation, and means whereby said meter when operated to register the connection is automatically rendered inoperative until the next succeeding connection.

72. In a telephone system, lines equipped for giving measured service, lines equipped for giving unmeasured service, a manual switchboard at which calls from said lines are answered and connections completed to called lines, and automatic means for indicating to the operator the character of the calling line before she tests the called line.

73. In a telephone system, a plurality of telephone lines of different kinds, means by which an operator may answer calls from any of said lines and complete connections to called lines, and automatic means for indicating to the operator the character of the line calling before she tests the called line.

74. In a telephone system, a called line, a guarding circuit for said called line, means for establishing connection with said line and for supplying a guarding potential to said called circuit, a discriminating signal, and means for applying said discriminating signal to said called line simultaneously with said guarding potential.

75. A telephone system including telephone lines extending to an exchange; extensions for such telephone lines; a line extending connecting device; controlling circuits associated with different telephone line extensions for governing the association of said connecting device; and operator controlled means for changing the character of the controlling circuits.

76. A telephone system including telephone lines; extensions for such telephone lines; a line extending connecting device; controlling circuits associated with different telephone line extensions for governing the association of said connecting device; and operator controlled means for changing the character of the controlling circuits.

77. A telephone system including telephone lines extending to an exchange; extensions for such telephone lines; a line extending connecting device; controlling circuits associated with different telephone line extensions for governing the association of said connecting device and individual to the line extensions pertaining to the line extending connecting device; and operator controlled means for changing the character of the controlling circuits.

78. A telephone system including telephone lines; extensions for such telephone lines; a line extending connecting device; controlling circuits associated with different telephone line extensions for governing the association of said connecting device and individual to the line extensions pertaining to the line extending connecting device; and operator controlled means for changing the character of the controlling circuits.

Signed by me at Chicago, Cook county, Illinois, this 17th day of February, 1911.

TALBOT G. MARTIN.

Witnesses:
ARTHUR J. RAY,
E. D. FALES.